(12) United States Patent
Kashiwazaki

(10) Patent No.: US 7,223,192 B2
(45) Date of Patent: May 29, 2007

(54) DIFFERENTIAL

(75) Inventor: Hiroaki Kashiwazaki, Tochigi (JP)

(73) Assignee: Tochigi Fuji Sangyo Kabushiki Kaisha, Tochigi-Shi (JP)

( * ) Notice: Subject to any disclaimer, the term of this patent is extended or adjusted under 35 U.S.C. 154(b) by 54 days.

(21) Appl. No.: 10/912,011

(22) Filed: Aug. 4, 2004

(65) Prior Publication Data

US 2005/0032601 A1 Feb. 10, 2005

(30) Foreign Application Priority Data

Aug. 5, 2003 (JP) ............................. 2003-286928

(51) Int. Cl.
*F16H 48/06* (2006.01)
(52) U.S. Cl. ..................... 475/230; 475/234
(58) Field of Classification Search ................ 475/230, 475/234, 235; 192/66.2, 66.21, 66.22, 66.23; F16H 48/20, F16H 48/00
See application file for complete search history.

(56) References Cited

U.S. PATENT DOCUMENTS

| | | | |
|---|---|---|---|
| 3,344,688 A * | 10/1967 | Frost | 475/234 |
| 3,402,799 A * | 9/1968 | Tharpe | 192/107 R |
| 3,477,312 A * | 11/1969 | Duer | 475/235 |
| 4,084,450 A | 4/1978 | Conroy | |
| 5,556,344 A * | 9/1996 | Fox | 475/235 |
| 5,951,431 A | 9/1999 | Downs et al. | |
| 6,066,063 A | 5/2000 | Ishikawa | |
| 6,743,136 B1 * | 6/2004 | Jensen | 475/160 |
| 2004/0149062 A1 * | 8/2004 | Atkinson et al. | 74/424 |

FOREIGN PATENT DOCUMENTS

| | | |
|---|---|---|
| DE | 10013429 | 7/2001 |
| JP | 46-8207 | 3/1971 |
| JP | 58137643 A * | 8/1983 |

* cited by examiner

*Primary Examiner*—Charles A. Marmor
*Assistant Examiner*—Justin K. Holmes
(74) *Attorney, Agent, or Firm*—Morrison & Foerster LLP

(57) ABSTRACT

A limited slip differential is provided with a rotatable casing for receiving input from an engine, a differential gear set of a bevel gear type and a pair of clutches. The differential gear set is provided with a pinion shaft supported in and rotated with the casing, a pinion gear rotatably supported by the pinion shaft and a pair of side gears for output, each of the side gears including gear portion engaged with the pinion gear. The gear portions are exposed to an internal surface of the casing so as not to obstruct oil circulation. The clutches are formed between the side gears and the casing and configured to frictionally transfer torque between the side gears and the casing.

7 Claims, 6 Drawing Sheets

DIFFERENTIAL

BACKGROUND OF THE INVENTION

1. Field of the Invention

The present invention relates to a differential having a differential gear set of a bevel gear type.

2. Description of the Related Art

Differentials are well known in the prior art, which distribute input torque to a pair of output axles and wheels respectively associated therewith. The differentials allow differential rotation between the wheels and hence maintain traction of wheels with the road while the vehicle is turning. However, provided that the differential rotation is completely free, when one of the wheels happens to lose traction with the road and starts spin-out, the other wheel is unable to receive torque from the differential. Some arts for limiting differential rotation are proposed as in a common name of "limited slip differential".

Japanese Patent Publication (Examined) No. S46-8207 discloses a torque sensitive limited slip differential. The differential is capable of transferring torque given to a differential casing to a pair of side gears though allowing differential rotation therebetween by means of a differential gear set of a bevel gear type, which is provided with pinion gears supported by a pinion shaft engaged with the side gears. The differential is further provided with clutch members, cone clutches respectively opposed thereto and tapered rings. Each of the opposed clutch members is provided with splines so as to engage and connect with the side gear and the axle. The tapered rings are fixed with the differential casing. When the pinion gears receive the torque via the differential casing, thrust force on the respective side gears is induced. The thrust force urges the clutch members toward the cone clutches and hence induces friction force therebetween. When the torque given to the differential casing is large enough, for example in a case of starting and accelerating the vehicle, the friction force limits the differential rotation.

SUMMARY OF THE INVENTION

The cone clutches are necessary to be lubricated with proper oil. The differential has a problem that the cone clutches may often experience lack of lubrication. The inventor had studied the problem and discovered that such oil is mainly supplied from circulating oil within the differential by means of centrifugal force by rotation of the case and the differential gear set and the clutch members partially hanging over the side gears is obstructive to the oil circulation toward the cone clutches.

The present invention is achieved in view of solving the above problem.

According to an aspect of the present invention, a differential is provided with a rotatable casing for receiving input from an engine and a differential gear set of a bevel gear supported in and rotated with the casing, a pinion gear rotatably supported by the pinion shaft and a pair of side gears for output, each of the side gears including gear portion engaged with the pinion gear. The gear portions are exposed to an internal surface of the casing.

Preferably, each of the side gears is provided with a friction surface and the friction surface and the casing forms a clutch configured to frictionally transfer torque between the casing and the side gear.

More preferably, the casing is provided with a pair of rings respectively interposed between the side gears and the casing and the clutches are respectively formed between the rings and the side gears.

Still more preferably, each of the rings is provided with a recess so dimensioned that the pinion gears pass through the recess.

Yet more preferably, an end of each of the recesses and an outer periphery of each of the pinion gears forms a clearance.

Preferably, the casing is provided with an aperture so dimensioned that the pinion gear is insertable to the aperture.

Still preferably, the casing is provided with an aperture so dimensioned that the side gears are insertable to the aperture.

More preferably, the aperture is so dimensioned that both the side gears and the pinion gear are insertable to the aperture.

Yet preferably, the casing is provided with a second aperture so dimensioned that the side gears are insertable to the second aperture.

Further preferably, the casing is formed in a unitary body.

DETAILED DESCRIPTION OF THE PREFERRED EMBODIMENT

Figure 1:
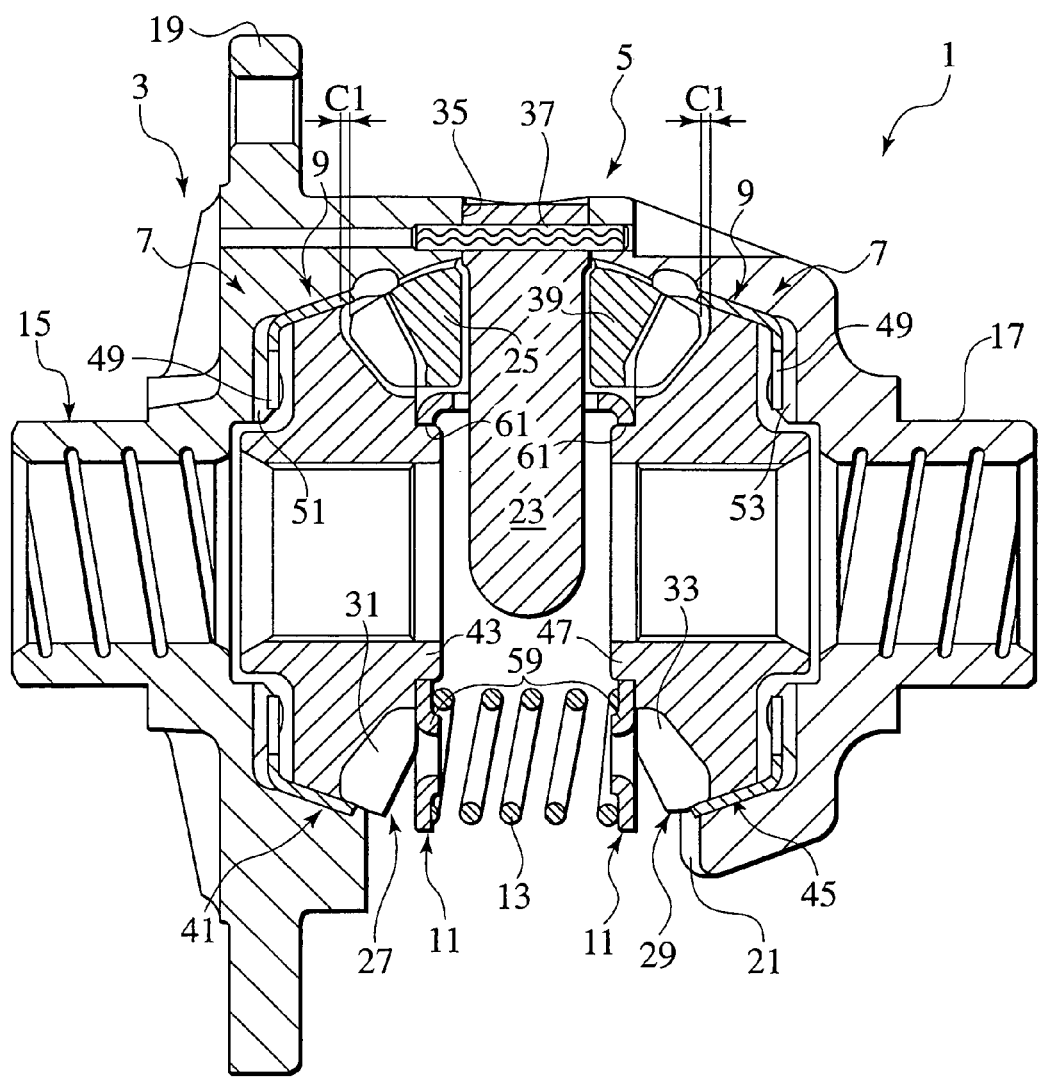
FIG. 1 is a sectional view of a differential according to a first embodiment of the present invention, wherein the upper half of the view is taken from a first plane perpendicular to a second plane from which the lower half of the view is taken.
Figure 2:
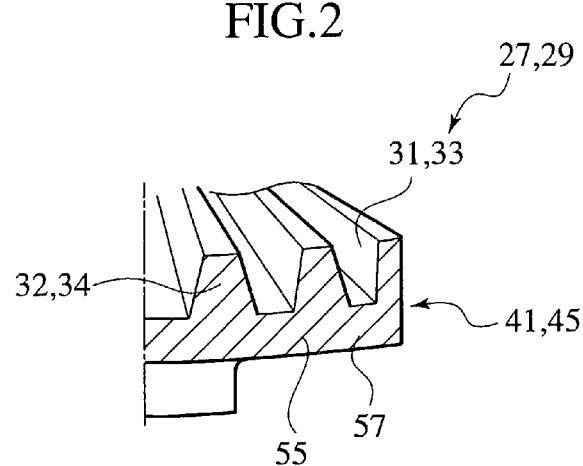
FIG. 2 is a partial side view of a pinion gear for the differential.
Figure 3:
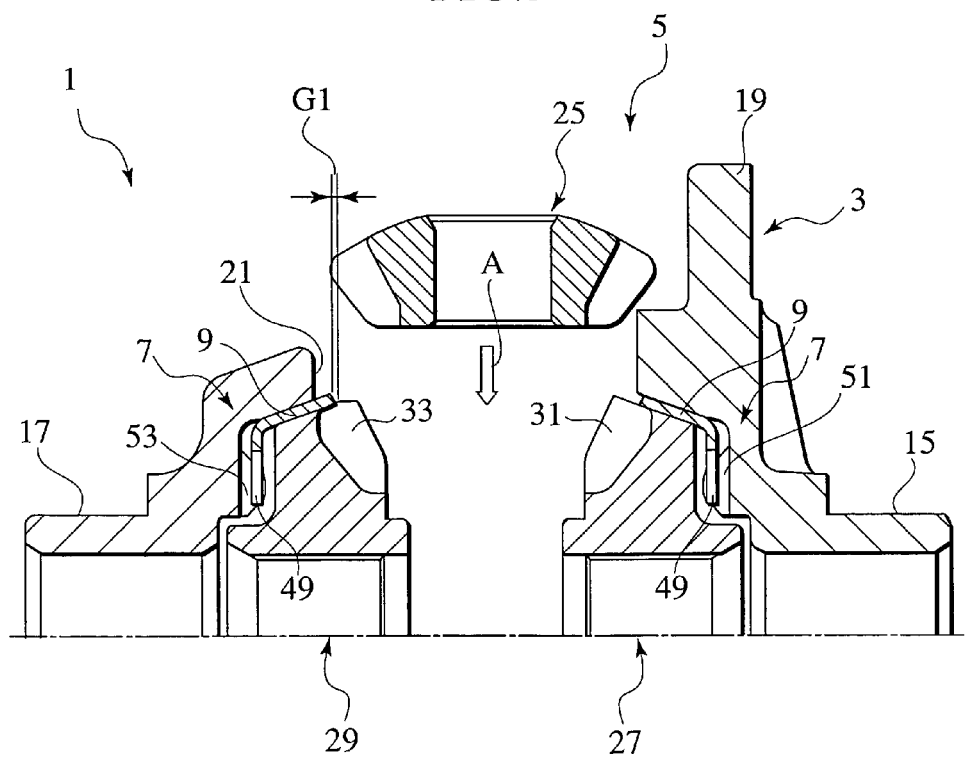
FIG. 3 shows installation of the pinion gear in the differential according to the first embodiment.

Certain embodiments of the present invention will be described hereinafter with reference to FIGS. 1 through 9. Throughout the specification and the drawings, definition of directions such as front and rear corresponds to directions of elements in practical use. Lateral directions of the drawings correspond to a lateral direction of the vehicle. In the description hereinafter, examples as front differentials will be described though the differentials may be applied as rear differentials.

Referring now to FIGS. 1 through 4 as a first embodiment of the present invention, a differential 1 is applied to a vehicle and differentially transfers torque given by an engine to right and left wheels via right and left axles connected to the differential 1.

The differential 1 is provided with a differential casing 3, a differential gear set 5 of a bevel gear type, a pair of tapered ring 9, a pair of retainers 11, a pair of springs 13. The differential 1 is housed in a differential carrier having an oil reservoir for lubricating the differential 1.

Figure 8:
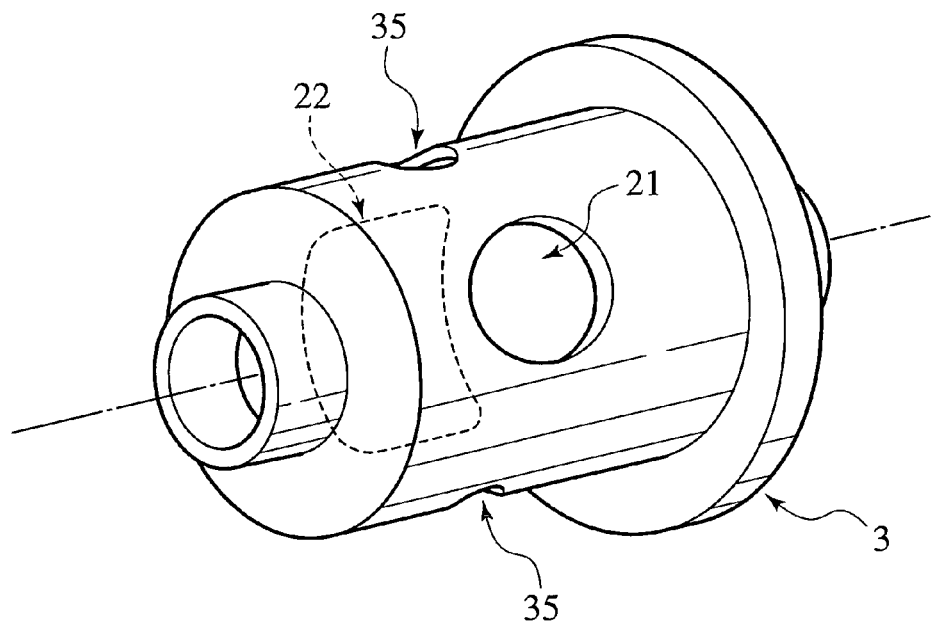
FIG. 8 is a schematic illustration of openings and apertures on a casing of the differential.

The differential casing 3 is provided with a pair of boss portions 15 and 17 projected laterally at both sides thereof, which are supported on the differential carrier. The differential casing 3 is further provided with a flange 19 projected outward and perpendicularly to the lateral direction thereof, to which a ring gear for input, to link with a transmission of a vehicle, is fixed. Thereby the differential casing 3 receives torque from an engine and rotates around a lateral axis. The differential casing 3 has first and second apertures 21 and 22 and openings 35 as illustrated in FIG. 8.

The differential gear set 5 is provided with a pinion shaft 23, a pair of pinion gears 25 rotatably supported by the pinion shaft 23, a pair of side gears 27 and 29 for output. The side gears 27 and 29 are respectively provided with gear portions 31 and 33, each of which is defined as an annular portion exterior to a dedendum circle and interior to an addendum circle, having gear teeth to engage with the pinion gears 25. The gear portions 31 and 33 have no flange or such hanging over the gear portions 31 and 33 and disposed close to an axis of the pinion gears 25. Thereby the gear portions 31 and 33 are exposed to the interior of the differential casing 3. The gear portions 31 and 33 may partially exposed. Alternatively, roots of the gear teeth may perfectly exposed.

Ends of the pinion shaft 23 are respectively engaged with the openings 35 and prevented from displacing with spring pins 37. Spherical washers 39 are respectively interposed between the pinion gears 25 and the differential casing 3 so as to support outer surfaces of the pinion gears 25 and receive centrifugal force and contact force thereof. The side gears 27 and 29 respectively have conical friction surfaces 41 and 45 on radially outer surfaces thereof and cylindrical projections 43 and 47 around radially inner peripheries as being opposed with each other. The side gears 27 and 29 are respectively rotatably supported by the differential casing 3 and inner peripheral surfaces of the side gears 27 and 29 respectively have internal splines for engaging with corresponding outer splines of left and right axles. The left side gear 27 links with the left axle and the right side gear 29 links with the right axle.

The left and right tapered rings 9 respectively have four projections 49 formed at even intervals on inner peripheries thereof, which respectively engage with corresponding recesses 51 and 53 formed on the differential casing 3 so as to prevent rotational displacement. The tapered rings 9 and the conical friction surfaces 41 and 45 respectively form left and right cone clutches 7. Plural oil grooves 55 and 57 are formed on the respective conical friction surfaces 41 and 45 as being crossing over with each other so as to keep and spread oil for lubrication over the surfaces. Thereby abrasion and overheating are prevented and stable operation is assured.

The retainers 11 respectively include retaining portions 59 and circular openings 61. The circular openings 61 respectively engage with the cylindrical projection 43 of the left side gear 27 and the cylindrical projection 47 of the right side gear 29 so that the retainers 11 are regularly positioned. Both ends of the springs 13 are respectively supported by the retaining portions 59. The springs 13 urge the retainers 11 and the side gears 27 and 29 toward the both sides so as to engage the left and right cone clutches 7, thereby initial torque is given to the side gears 27 and 29 via the cone clutches 7.

The boss portions 15 and 17 have helical oil grooves 16 and 18 on inner surfaces thereof. The oil in the oil reservoir flows in and out of the differential casing 3 through the helical oil grooves 16 and 18 and the aperture 21. Moreover, the gear portions 31 and 33 are exposed to the interior of the differential casing 3 so that the oil circulation from the gear portions 31 and 33 to the interior of the differential casing 3 by means of centrifugal force is not obstructed. The circulating oil further circulates to the cone clutches 7. Thereby lubrication and cooling of the cone clutches 7, engaging points among the gears 25, 27 and 29, sliding clearance between the pinion shaft 23 and the pinion gears 25, the spherical washers 39, sliding clearances between the retainers 11 and the side gears 27 and 29 and such are effectively achieved.

The differential 1 is capable of transferring torque given to the differential casing 3 to the side gears 27 and 29 and further to the left and right wheels though allowing differential rotation. Thereby the differential 1 maintains traction of wheels with the road while the vehicle is turning.

When the pinion gears 39 receive the torque via the differential casing 3, thrust force on the respective side gears 27 and 29 is induced so that the cone clutches 7 are further tightly engaged and frictionally transfer the torque to the side gears 27 and 29 in part. The force for engagement of the cone clutches 7 is increased when the torque given by the engine is greater, thereby the function limiting differential rotation is torque-sensitively operated. When one of the wheels happens to lose traction with the road and starts spin-out, for example in a case of starting and accelerating the vehicle, the differential 1 is capable of limiting differential rotation. Moreover, the initial torque induced by the springs 13 assures limiting differential rotation independently from the torque transferred by the differential gear set 5.

The differential casing 3 includes the first and second apertures 21 and 22 and the openings 35 as illustrated in FIG. 8. The first aperture 21 has a substantially circular shape and is dimensioned so as to receive the pinion gears 25, namely, the internal diameter of the second aperture 22 is slightly larger than the external diameter of the pinion gears 25. The second aperture 22 has a substantially rectangular shape and is dimensioned so as to receive the differential gear set 5, the tapered rings 9, the retainers 11 and the springs 13. Particularly, the length of the longer side of the second aperture 22 is slightly larger than the diameter of the side gears 27 and 29.

Figure 4:
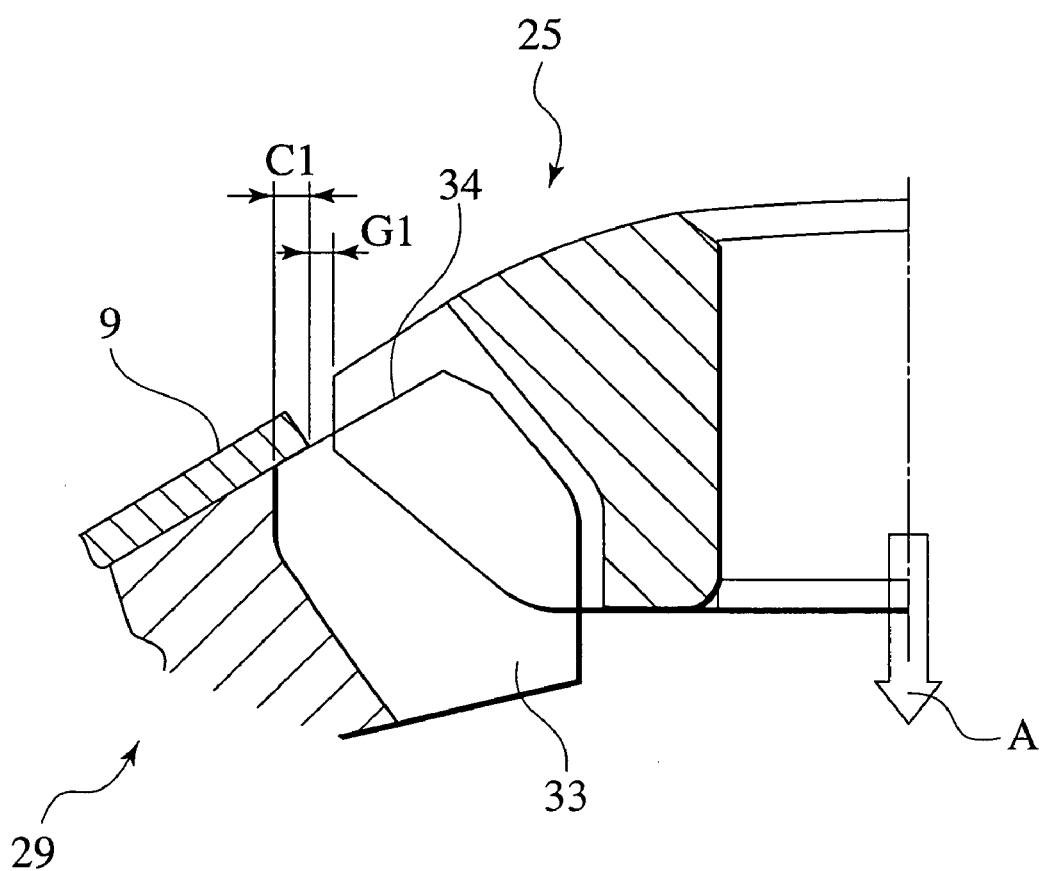
FIG. 4 shows relationship among the pinion gear, side gears and tapered rings according to the first embodiment.

Installation of the internal elements to the differential casing 3 can be easily done as the following procedure. First the differential gear set 5, the tapered rings 9, the retainers 11 and the springs 13 are inserted through the second aperture 22 and installed with in the differential casing 3. When pressing the side gears 27 and 29 toward both sides, proper clearances G1 between the tapered rings 9 and the pinion gears 25 are left as shown in FIG. 4. Thereby the pinion gears 25 can be inserted through the second aperture 22 and installed within the differential casing 3.

FIG. 4 partially shows a state where the internal elements are all installed in the differential casing 3. In the state, respective outer surfaces 32 and 34 of the gear portions 31 and 33 overlap and slide with inner surfaces of the tapered rings 9 with an overlapping length C1.

Figure 9:
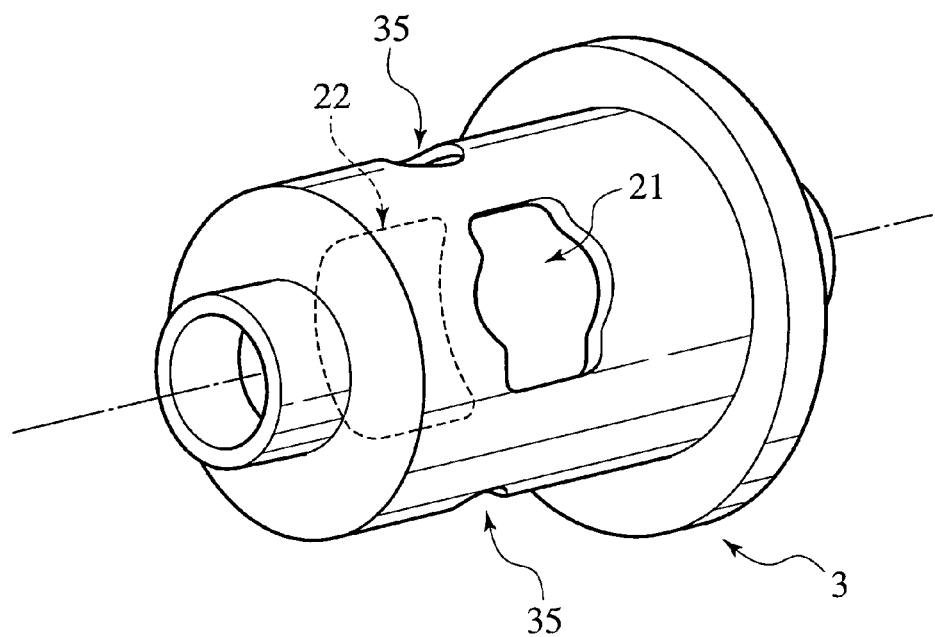
FIG. 9 is a schematic illustration of modified configuration of the openings and the apertures.

The first and second apertures 21 and 22 may alternatively be formed as shown in FIG. 9. The outer shape of the first aperture 21 is composed of a circle and a rectangle. Furthermore, the first aperture 21 is dimensioned soas to receive the differential gear set 5, the tapered rings 9, the retainers 11, the springs 13 and the pinion gears 25. The rectangular portion of the first aperture 21, as in the longer side thereof, has a length slightly larger than the diameter of the side gears 27 and 29. The circular portion of the first aperture 21 has a diameter slightly larger than the external diameter of the pinion gears 25. Thereby the differential gear set 5, the tapered rings 9, the retainers 11, the springs 13 and the pinion gears 25 are all inserted through the first aperture 21 and installed in the differential casing 3. The second aperture 22 can be formed in any shape though preferably have the substantially same size as the first aperture 21 so as to keep balance in weight.

As being understood from the above description, installation of the elements to the differential casing 3 can be easily done. Furthermore, the differential casing 3 can formed in a unitary body and is not necessary to be formed in two or three bodies. Such constitution makes installation and/or maintenance procedures easy and is easy to be produced.

Figure 5:
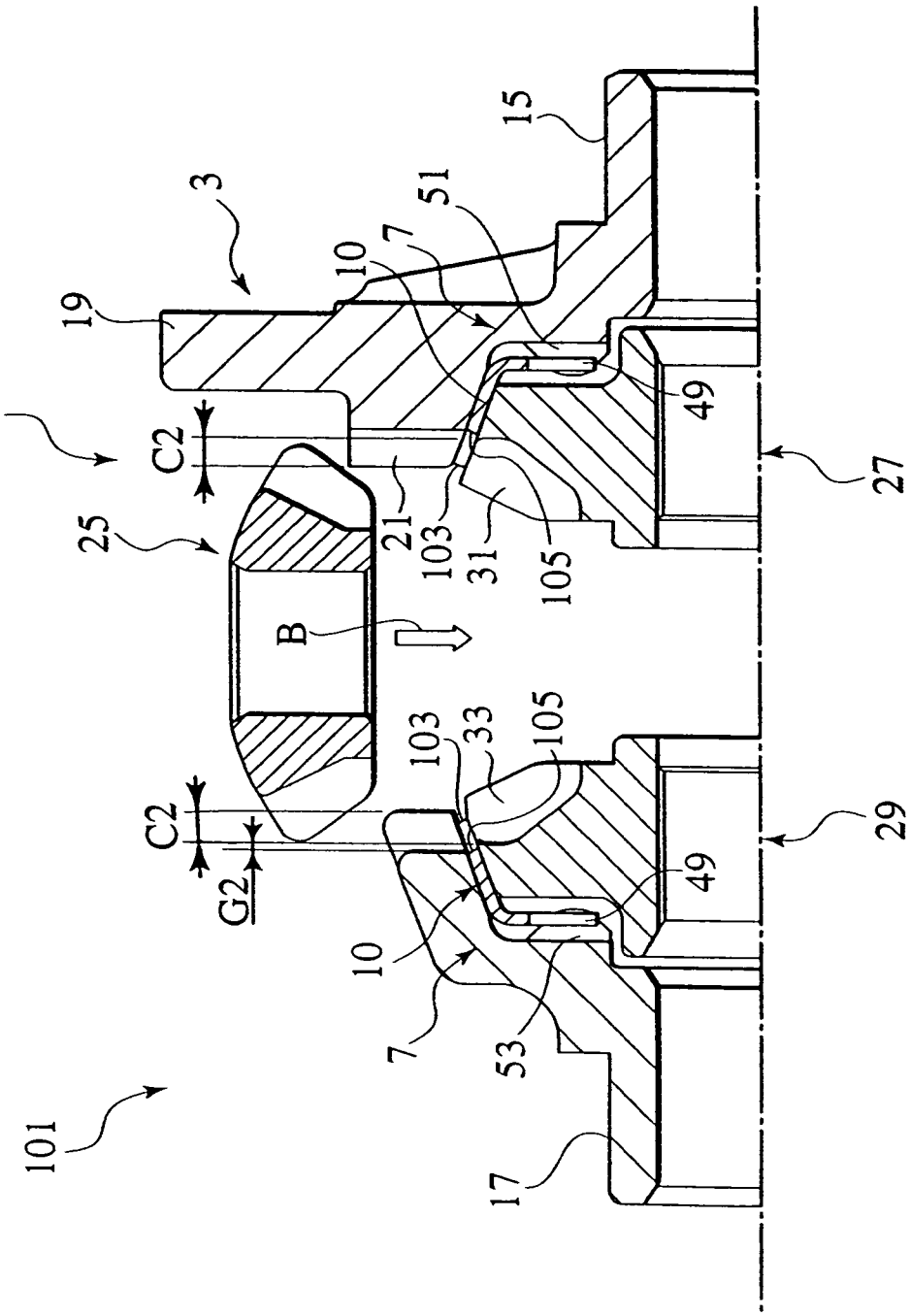
FIG. 5 shows installation of a pinion gear in the differential according to a second embodiment.
Figure 6:
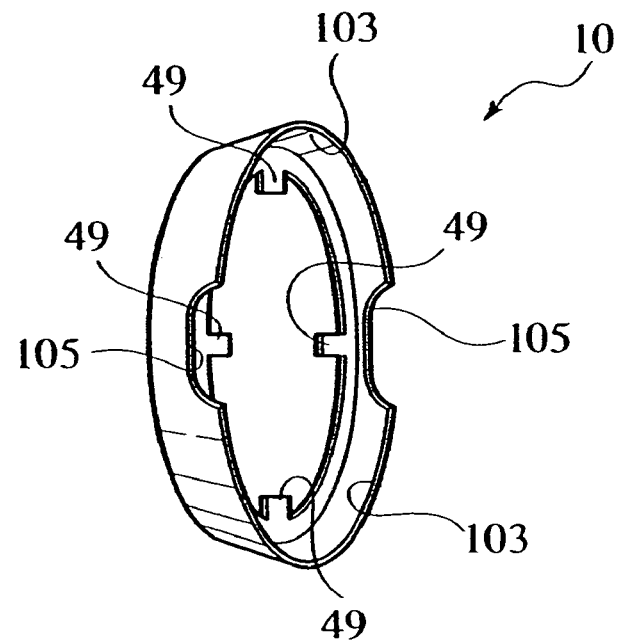
FIG. 6 is a perspective view of a tapered ring according to the second embodiment.
Figure 7:
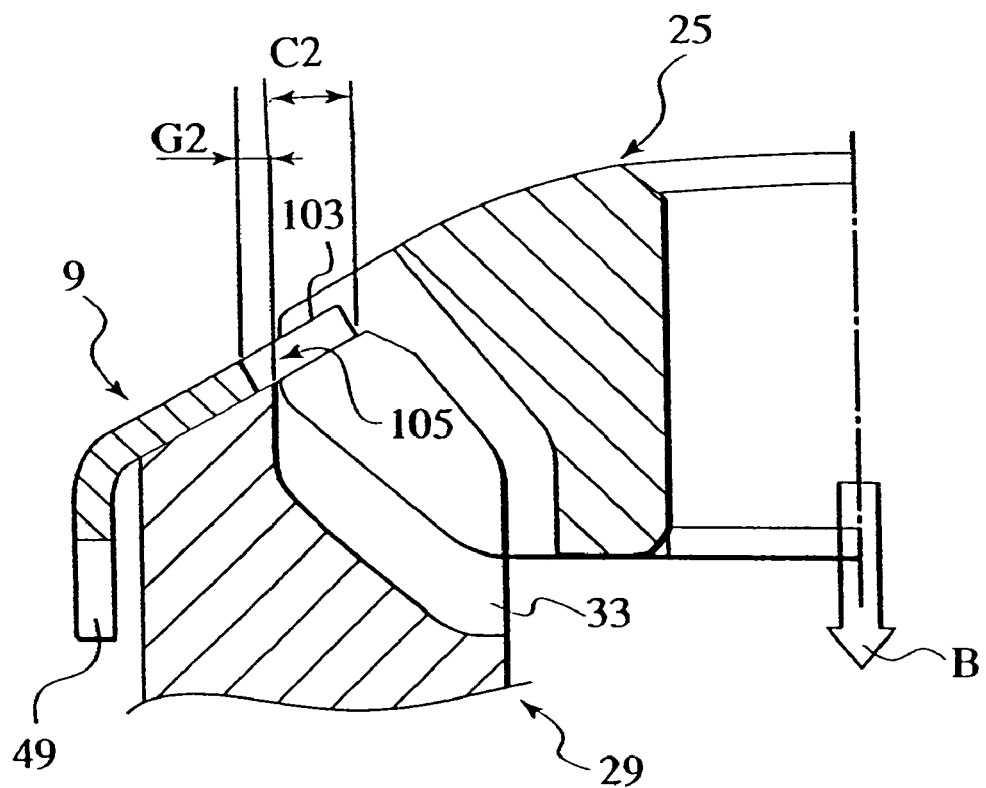
FIG. 7 shows relationship among the pinion gear, side gears and the tapered rings according to the second embodiment.

Referring now to FIGS. 5 through 7 as a second embodiment of the present invention, a differential 101 will be described. Elements substantially equivalent to the elements described above will be referred as the same reference numerals and detailed descriptions will be omitted. Mainly differences will be described.

Each of tapered rings 10 according to the present embodiment includes an outer periphery 103 having a pair of recesses 105. The outer periphery 103 extends longer than that of the tapered ring 9 of the first embodiment and hence has a longer overlapping length C2 as shown in FIG. 7. The recesses 105 are just opposed with each other.

The pinion gears 25 can be inserted through the recesses 105 because clearances G2 exist between ends of the recesses 105 and the outer peripheries of the pinion gears 25 as shown in FIG. 7. Thereby the pinion gears 25 can be easily inserted through the aperture 21.

The tapered rings 10 of the present embodiment assure wider contact areas as compared with the tapered rings 9 of the above first embodiment because the outer peripheries 103 extend longer. Thereby larger braking force by the cone clutches 7 can be obtained and the function limiting differential rotation is further assured when one of the wheels happens to lose traction with the road and starts spin-out, for example in a case of starting and accelerating the vehicle. Moreover the tapered rings 10 do not obstruct the oil circulation from the gears so that the stable lubrication can be obtained as in the case with the first embodiment.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A differential comprising:
   a rotatable casing for receiving input from an engine;
   a differential gear set of a bevel gear type, the differential gear set including:
   a pinion shaft supported in and rotated with the casing;
   a pinion gear rotatably supported by the pinion shaft; and
   a pair of side gears for output, each of the side gears including a body having a friction surface and a gear portion standing from the body and being engaged with the pinion gear; and
   a pair of rings respectively interposed between the side gears and the casing, each of the rings being so dimensioned as to expose the gear portion to an internal surface of the casing and including a recess along an outer periphery of the ring, wherein when the pair of rings are interposed between the side gears and the casing, said two recesses are so dimensioned that the entire pinion gear passes through said two recesses with a clearance.

2. The differential of claim 1, wherein:
   the friction surfaces and the rings form clutches configured to frictionally transfer torque among the casing and the side gears.

3. The differential of claim 1, wherein:
   the casing includes an aperture so dimensioned that the side gears are insertable to the aperture.

4. The differential of claim 1, wherein:
   the casing includes an aperture so dimensioned that the pinion gear is insertable to the aperture.

5. The differential of claim 4, wherein:
   the aperture is further so dimensioned that the side gears are insertable to the aperture.

6. The differential of claim 4, wherein:
   the casing further comprising a second aperture so dimensioned that the side gears are insertable to the second aperture.

7. The differential of claim 4, wherein:
   the casing is formed in a unitary body.

* * * * *